United States Patent [19]
Hamano

[11] Patent Number: 5,933,283
[45] Date of Patent: Aug. 3, 1999

[54] ZOOM LENS

[75] Inventor: Hiroyuki Hamano, Yamato, Japan

[73] Assignee: Canon Kabushiki Kaisha, Tokyo, Japan

[21] Appl. No.: 08/835,191

[22] Filed: Apr. 4, 1997

[51] Int. Cl.$^6$ .................................................. G02B 15/14
[52] U.S. Cl. ......................................... 359/687; 359/684
[58] Field of Search ..................................... 359/684, 687

[56] References Cited

U.S. PATENT DOCUMENTS

| | | | |
|---|---|---|---|
| 4,934,796 | 6/1990 | Sugiura et al. | 350/427 |
| 4,998,809 | 3/1991 | Tsuji et al. | 350/500 |
| 5,009,492 | 4/1991 | Hamano | 350/427 |
| 5,044,706 | 9/1991 | Chen | 359/357 |
| 5,134,524 | 7/1992 | Hamano et al. | 359/687 |
| 5,138,492 | 8/1992 | Hamano et al. | 359/684 |
| 5,148,314 | 9/1992 | Chen | 359/642 |
| 5,299,064 | 3/1994 | Hamano et al. | 359/684 |
| 5,430,576 | 7/1995 | Hamano | 359/684 |
| 5,521,758 | 5/1996 | Hamano | 359/557 |
| 5,546,230 | 8/1996 | Sato et al. | 359/684 |
| 5,600,490 | 2/1997 | Sugawara et al. | 359/690 |
| 5,638,216 | 6/1997 | Horiuchi et al. | 359/683 |

FOREIGN PATENT DOCUMENTS

| | | |
|---|---|---|
| 62-24213 | 2/1987 | Japan . |
| 62-247316 | 10/1987 | Japan . |
| 4-43311 | 2/1992 | Japan . |
| 5-60974 | 3/1993 | Japan . |

*Primary Examiner*—Georgia Epps
*Assistant Examiner*—Michael A. Lucas
*Attorney, Agent, or Firm*—Fitzpatrick, Cella, Harper & Scinto

[57] ABSTRACT

A zoom lens comprises, in order from an object side, a first lens unit having a positive refractive power, a second lens unit having a negative refractive power, a third lens unit having a positive refractive power and a fourth lens unit having a positive refractive power, wherein at least the second and fourth lens units are moved to vary magnification and the fourth lens unit is moved to effect focusing, and wherein the third lens unit is composed of one positive lens and one negative lens and an aperture stop is disposed between the positive lens and the negative lens in the third lens unit.

14 Claims, 10 Drawing Sheets

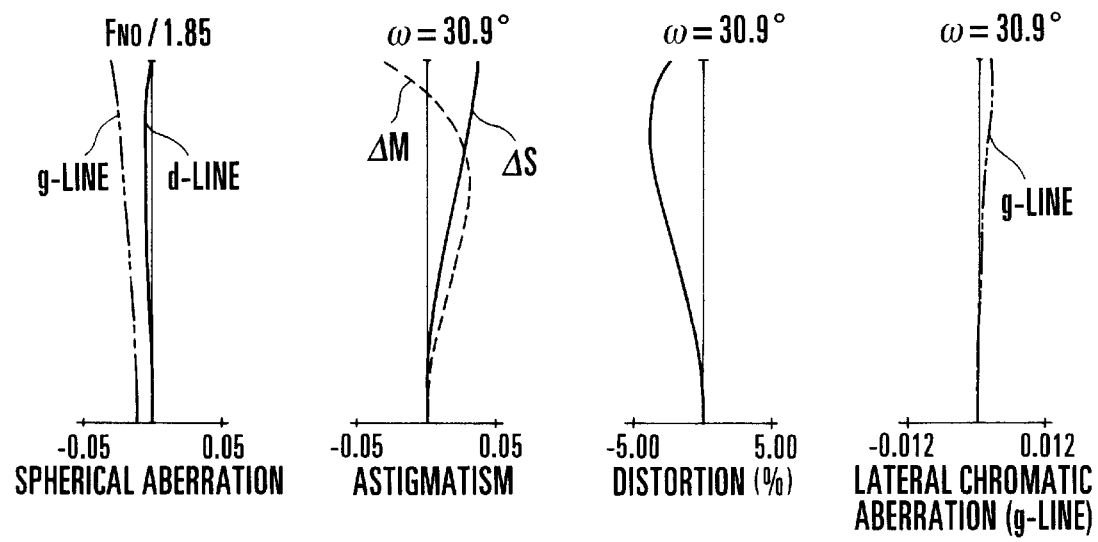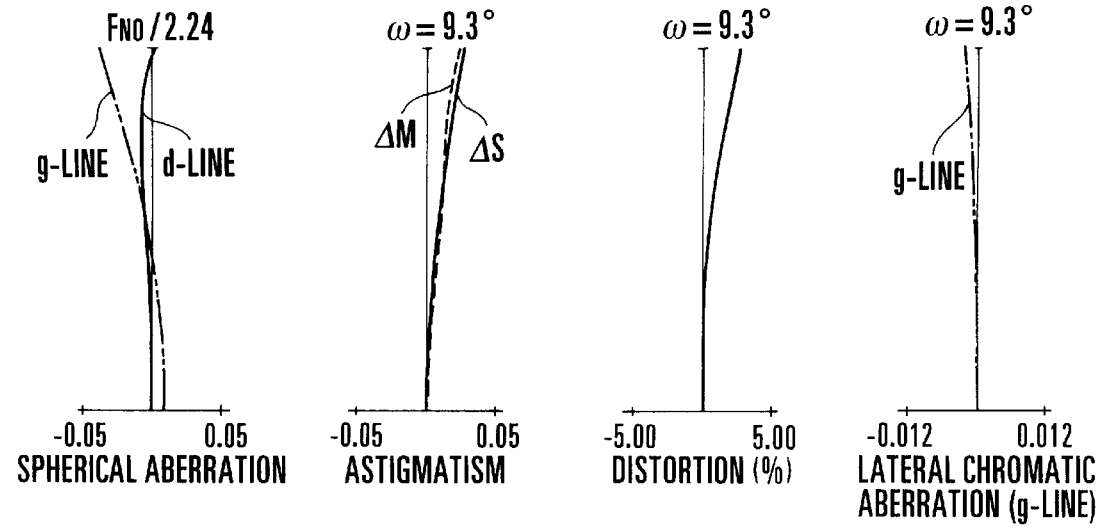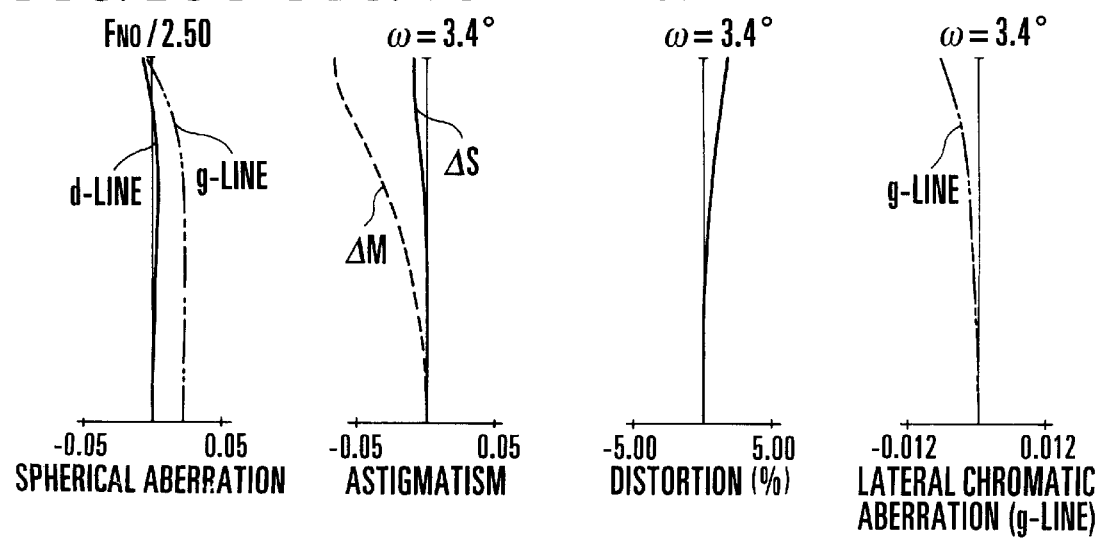

FIG. 3A-1
F<sub>NO</sub>/1.85
FIG. 3A-2
ω = 30.9°
FIG. 3A-3
ω = 30.9°
FIG. 3A-4
ω = 30.9°
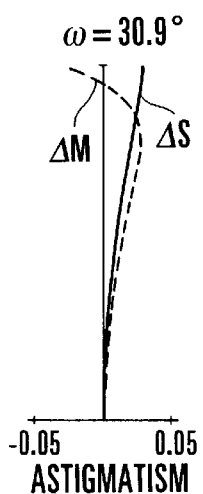
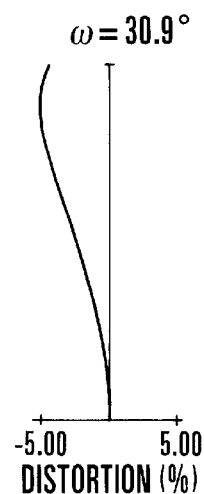
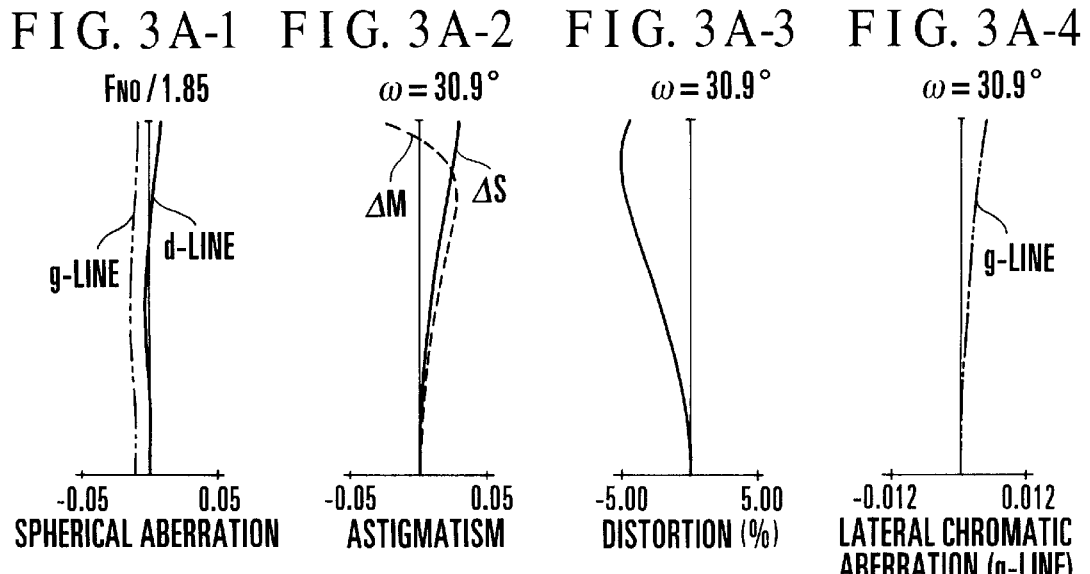
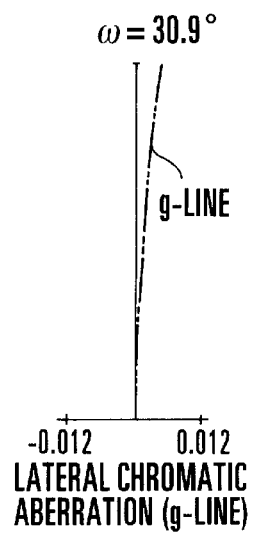
-0.05  0.05
SPHERICAL ABERRATION
-0.05  0.05
ASTIGMATISM
-5.00  5.00
DISTORTION (%)
-0.012  0.012
LATERAL CHROMATIC ABERRATION (g-LINE)
FIG. 3B-1
F<sub>NO</sub>/2.23
FIG. 3B-2
ω = 9.3°
FIG. 3B-3
ω = 9.3°
FIG. 3B-4
ω = 9.3°
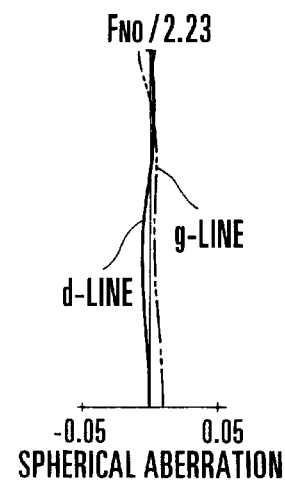
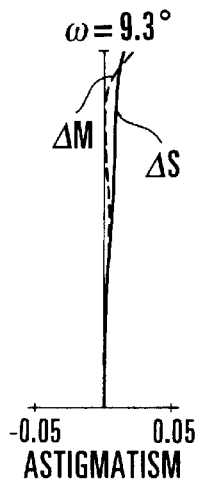
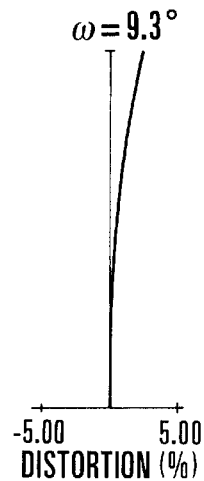
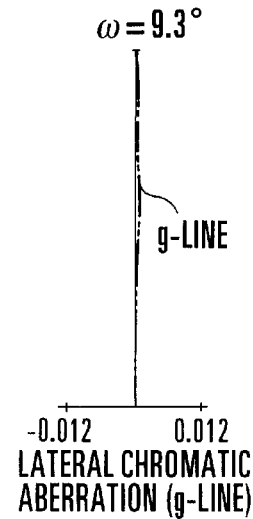
-0.05  0.05
SPHERICAL ABERRATION
-0.05  0.05
ASTIGMATISM
-5.00  5.00
DISTORTION (%)
-0.012  0.012
LATERAL CHROMATIC ABERRATION (g-LINE)
FIG. 3C-1
F<sub>NO</sub>/2.52
FIG. 3C-2
ω = 3.4°
FIG. 3C-3
ω = 3.4°
FIG. 3C-4
ω = 3.4°
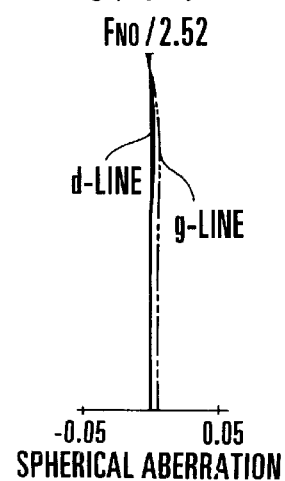
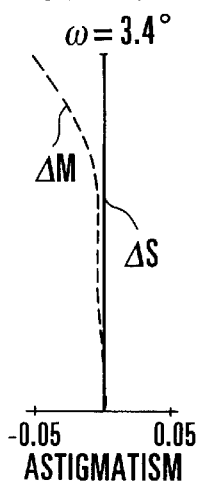
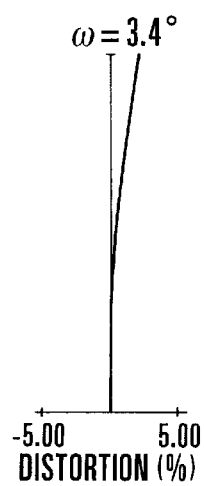
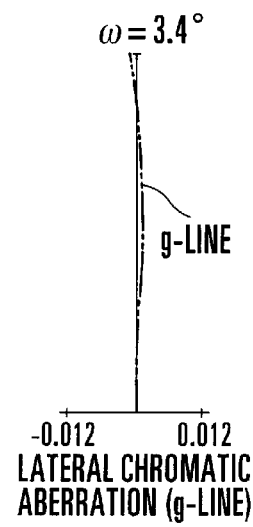
-0.05  0.05
SPHERICAL ABERRATION
-0.05  0.05
ASTIGMATISM
-5.00  5.00
DISTORTION (%)
-0.012  0.012
LATERAL CHROMATIC ABERRATION (g-LINE)

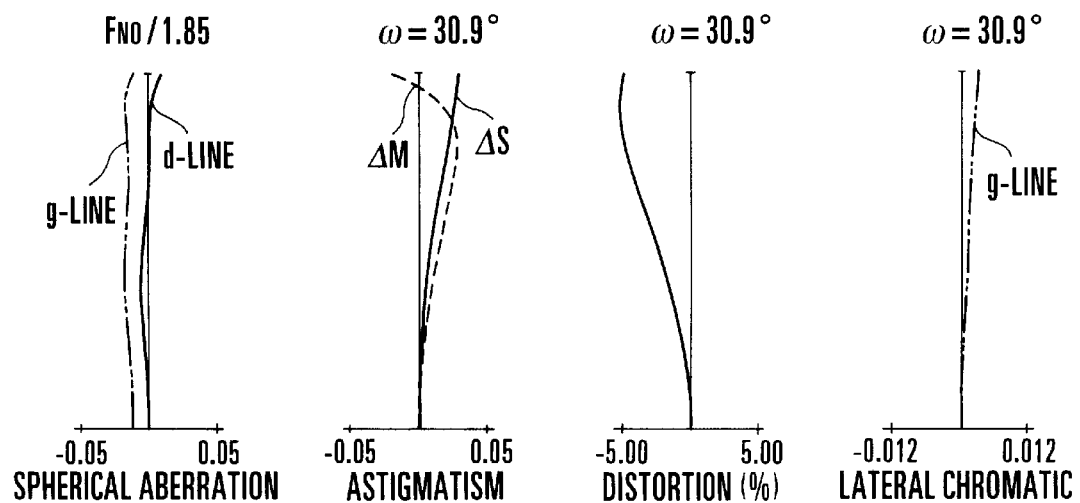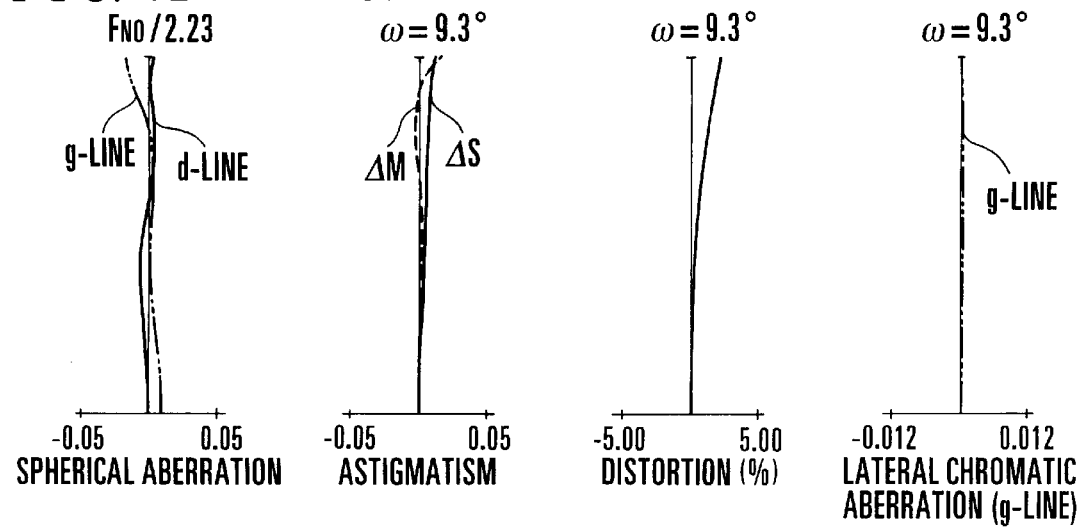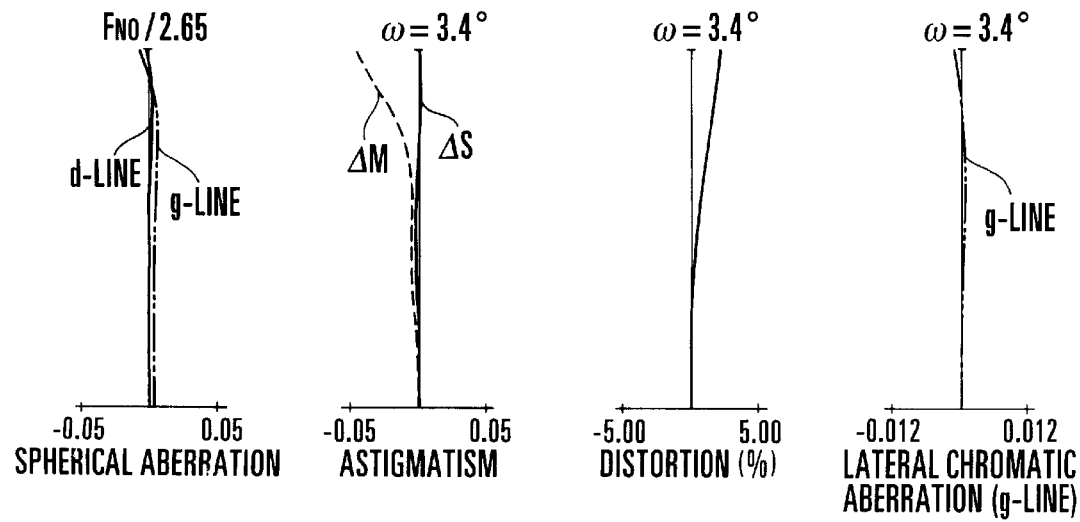

ZOOM LENS

BACKGROUND OF THE INVENTION

1. Field of the Invention

This invention relates to zoom lenses suited to be used in video cameras or photographic cameras and, more particularly, a zoom lens whose zoom ratio is about 10 and whose F-number is about 1.8 with the bulk and size thereof being minimized, while still permitting maintenance of a good optical performance.

2. Description of Related Art

For the photographic camera or video camera, there have been many previous proposals for zoom lenses of a type in which a lens unit other than the front or first lens unit is made movable for focusing, or of the so-called "rear focus" type.

In general, as compared with the zoom lens whose first lens unit is moved to effect focusing, the zoom lens of the rear focus type has advantages that the effective diameter of the first lens unit becomes smaller so that it becomes easier to improve the compact form of the entire zoom lens, that close-up photography, particularly, supershort focusing, is carried out with ease, and further that, since the lens unit for focusing is smaller in size and lighter in weight, because a weaker driving torque suffices for moving it, rapid focus adjustment can be carried out.

Such a zoom lens of the rear focus type is disclosed in, for example, Japanese Laid-Open Patent Application Nos. Sho 62-24213 and Sho 62-247316, where the zoom lens comprises, in order from an object side, a positive first lens unit, a negative second lens unit, a positive third lens unit and a positive fourth lens unit, the second lens unit being moved axially to vary the focal length and the fourth lens unit being moved axially to compensate for the image shift with zooming. Focusing is performed by moving the fourth lens unit.

In Japanese Laid-Open Patent Application No. Hei 4-43311, a zoom lens comprises, in order from an object side, a first lens unit of positive refractive power, a second lens unit of negative refractive power, a third lens unit of positive refractive power and a fourth lens unit of positive refractive power, wherein the third lens unit is composed of a positive lens and a negative lens in the form of the telephoto type, thus shortening the overall length of the third lens unit and subsequent lens units.

Also, in Japanese Laid-Open Patent Application No. Hei 5-60974, the third lens unit is composed of a positive lens and a negative meniscus lens concave toward the image side. The third lens unit is thus simplified in the construction.

In most cases, the use of the rear focus type in the zoom lens produces the characteristics described before. That is, the entirety of the lens system is minimized in bulk and size. Rapid focusing becomes possible. Further, close-up photography becomes easier to do.

In the case of the zoom lens which comprises, in order from an object side, a first lens unit of positive refractive power, a second lens unit of negative refractive power, a third lens unit of positive refractive power and a fourth lens unit of positive refractive power, if attempts are made to shorten the overall physical length of the third lens unit and the subsequent lens unit by increasing the refractive power of the third lens unit, the zooming or focusing movement of the fourth lens unit is caused to increase unduly greatly. With zooming in the intermediate region of focal lengths, therefore, for a close object, problems arise in that the third and fourth lens units are caused to mechanically interfere with each other, or that, as the air separation between the third and fourth lens units has to be widened greatly, the total length is caused to become rather longer.

Also, in this instance, the variation of aberrations with zooming or focusing is increased. It is, therefore, very difficult to simultaneously fulfill the requirements of achieving improvements of the compact form and of maintaining a good stability of high optical performance throughout.

BRIEF SUMMARY OF THE INVENTION

The invention employs the rear focusing method and is to greatly increase the relative aperture and the zooming range at once. An object of the invention is, therefore, to provide a zoom lens of the rear focus type with the total length of the entire zoom lens shortened to improve the compact form, while still permitting a good stability of optical performance to be maintained at a high level throughout the entire zooming range from a wide-angle end to a telephoto end and throughout the entire focusing range from an infinitely distant object to a closest object.

In accordance with one aspect of the invention, there is provided a zoom lens which comprises, in order from an object side, a first lens unit having a positive refractive power, a second lens unit having a negative refractive power, a third lens unit having a positive refractive power and a fourth lens unit having a positive refractive power, wherein at least the second and fourth lens units are moved to vary magnification and the fourth lens unit is moved to effect focusing, and wherein the third lens unit is composed of one positive lens and one negative lens and an aperture stop is disposed between the positive lens and the negative lens in the third lens unit.

BRIEF DESCRIPTION OF THE SEVERAL VIEWS OF THE DRAWING

FIGS. 2A-1 to 2A-4, FIGS. 2B-1 to 2B-4 and FIGS. 2C-1 to 2C-4 are graphic representations of the aberrations of the numerical example 1 of the invention.

FIGS. 3A-1 to 3A-4, FIGS. 3B-1 to 3B-4 and FIGS. 3C-1 to 3C-4 are graphic representations of the aberrations of the numerical example 2 of the invention.

FIGS. 4A-1 to 4A-4, FIGS. 4B-1 to 4B-4 and FIGS. 4C-1 to 4C-4 are graphic representations of the aberrations of the numerical example 3 of the invention.

FIGS. 6-1 to 6-4 are graphic representations of the aberrations of the numerical example 4 of the invention in the wide-angle end.

FIGS. 7-1 to 7-4 are graphic representations of the aberrations of the numerical example 4 of the invention in a middle position.

FIGS. 8-1 to 8-4 are graphic representations of the aberrations of the numerical example 4 of the invention in the telephoto end.

FIGS. 9-1 to 9-4 are graphic representations of the aberrations of the numerical example 5 of the invention in the wide-angle end.

FIGS. 10-1 to 10-4 are graphic representations of the aberrations of the numerical example 5 of the invention in a middle position.

FIGS. 11-1 to 11-4 are graphic representations of the aberrations of the numerical example 5 of the invention in the telephoto end.

FIGS. 12-1 to 12-4 are graphic representations of the aberrations of the numerical example 6 of the invention in the wide-angle end.

FIGS. 13-1 to 13-4 are graphic representations of the aberrations of the numerical example 6 of the invention in a middle position.

FIGS. 14-1 to 14-4 are graphic representations of the aberrations of the numerical example 6 of the invention in the telephoto end.

In the aberration curves, ΔM stands for the meridional image focus, ΔS stands for the sagittal image focus, d stands for the spectral d-line, g stands for the spectral g-line, and IP stands for the image plane.

DETAILED DESCRIPTION OF THE INVENTION

The invention is next described in great detail in connection with preferred embodiments thereof with reference to the drawings.

Figure 1:
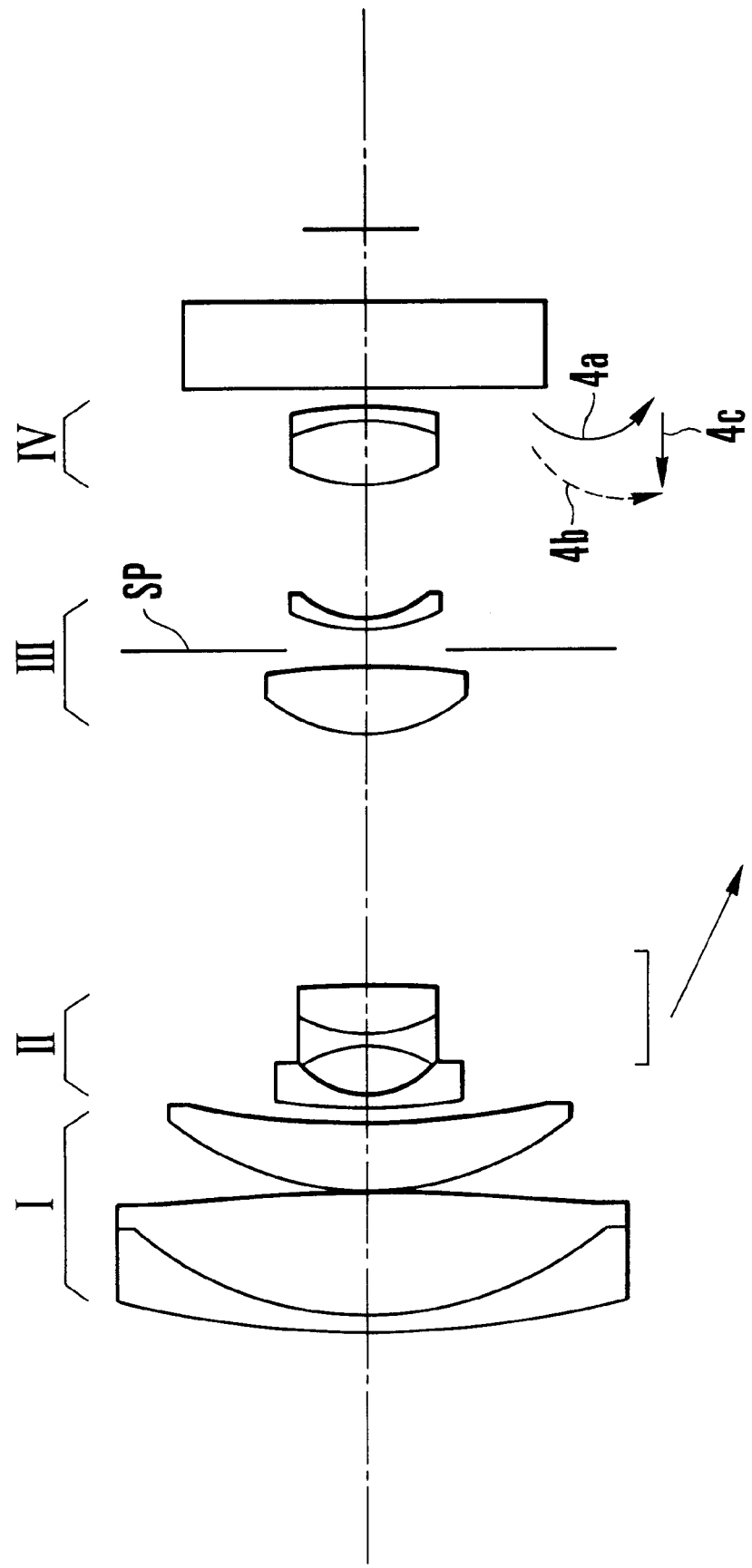
FIG. 1 is a longitudinal section view of a first embodiment (numerical examples 1 to 3) of a zoom lens according to the invention.

FIG. 1 is a longitudinal section view of a first embodiment (numerical examples 1 to 3) of a zoom lens according to the invention. In FIG. 1, the zoom lens comprises, in order from an object side, a first lens unit I of positive refractive power, a second lens unit II of negative refractive power, a third lens unit III of positive refractive power and a fourth lens unit IV of positive refractive power.

During zooming from the wide-angle end to the telephoto end, at least the second lens unit moves axially toward the image side as shown by the arrow, while the fourth lens unit is simultaneously moved to compensate for the shift of the image plane IP with zooming.

The fourth lens unit is also moved axially to effect focusing. That is, the rear focus type is employed. When focusing on an object at infinity or at the minimum distance, as zooming from the wide-angle end to the telephoto end, the fourth lens unit moves in a locus shown respectively by a solid line curve 4a or a dashed line curve 4b in FIG. 1 to compensate for the image shift.

Incidentally, in the first embodiment, the first lens unit and the third lens unit remain stationary during zooming and during focusing.

It is also to be noted that at least the first lens unit may be moved in order to lessen the zooming duty that the second lens unit bears.

In the first embodiment, the provisions for compensating for the image shift with zooming and for focusing are made in the fourth lens unit. In particular, as shown by the curves 4a and 4b in FIG. 1, the locus in which the fourth lens unit moves when zooming from the wide-angle end to the telephoto end is made convex toward the object side. This assures efficient utilization of the air space between the third lens unit and the fourth lens unit, thus achieving a shortening of the total length of the entire zoom lens advantageously.

In the first embodiment, with setting in, for example, in the telephoto end, when focusing from an infinitely distant object to closer objects, the fourth lens unit moves forward as shown by a straight line 4c in FIG. 1.

Moreover, according to the invention, the third lens unit is composed of only one positive lens and only one negative lens as arranged in this order from the object side. In addition to the use of such a telephoto form, the space efficiency has to be improved. So, an aperture stop is disposed in the space between the positive lens and the negative lens in the third lens unit, thereby making it possible to shorten the total length of that part of the entire zoom lens which follows the third lens unit.

Concerning this arrangement, a bit more detailed explanation is given here. To achieve reduction of the size of the zoom lens, there is a need to strengthen the negative refractive power of the second lens unit in order to reduce its total zooming movement, so far as the problem of aberration correction permits. In this case, the divergence of the light bundle from the second lens unit becomes stronger. Therefore, to shorten the total length of that part of the entire zoom lens which follows the third lens unit, reduction of the interval between the principal points of the second and third lens units is advantageous. On the contrary, in the prior art, the aperture stop is disposed between the second lens unit and the third lens unit. Therefore, there is need to create an additional space for the aperture stop. If, in this case, attempts are made to much more shorten the total length of that part of the entire zoom lens which follows the third lens unit, a necessity arises for making even stronger the refractive power of the negative lens of the third lens unit to increase the telephoto ratio. Therefore, the Petzval sum of the entire zoom lens, which is once increased in the negative sense as the refractive power of the second lens unit is strengthened, is further increased in the negative sense. Particularly, the sagittal curvature of field becomes difficult to correct.

On this account, according to the invention, the aperture stop is disposed in the space between the positive lens and the negative lens of the third lens unit. This arrangement allows the separation between the second lens unit and the third lens unit to be reduced. Conversely, the positive lens and the negative lens in the third lens unit are spaced so wide as to accommodate the aperture stop. With such a measure in use, for an equivalent amount of shortening of the total length, the separation between the positive and negative lenses in the third lens unit can be made wider. In turn, the refractive power of the negative lens of the third lens unit can be made smaller. Therefore, the increase of the negative Petzval sum is minimized, thus permitting a good correction of field curvature when the total length of the entire zoom lens is shortened.

The use of the features described above makes it possible to provide a zoom lens of the rear focus type whose total number of constituent lenses is fewer than was heretofore possible and which has a high zoom ratio despite achievement of the shortening of the total length of the entire zoom lens. To attain more improved results, it is preferable to satisfy one of the following conditions.

Letting an air separation between a lens surface closest to the image side of the second lens unit and a lens surface closest to the object side of the third lens unit in the telephoto end be denoted by $D_{23}$, and a focal length in the wide-angle end of the entire zoom lens be denoted by $f_W$, the following condition is satisfied:

$$D_{23}/f_W < 0.25 \qquad (1).$$

Under this condition, the distance between the second and third lens units is appropriately determined to shorten the total length of the entire zoom lens advantageously.

When the upper limit of the condition (1) is exceeded, as this means that the separation between the second and third lens units is too long, the entire zoom lens becomes stronger in the degree of retro-focus, so that it becomes difficult to shorten the entire zoom lens.

Further, letting an air separation between the positive lens and the negative lens of the third lens unit be denoted by $D_{3M}$, the following condition is satisfied:

$$0.32 < D_{3M}/f_W < 0.56 \qquad (2).$$

When the upper limit of the condition (2) is exceeded, it becomes difficult to secure the back focal distance as the telephoto ratio of the third lens unit increases. When the lower limit is exceeded, the space between the positive lens and the negative lens of the third lens unit becomes too short to accommodate the aperture stop.

Also, in the first embodiment, the telephoto ratio of the third lens unit is increased to produce an advantage of facilitating correction of spherical aberration and others. To this purpose, the negative lens of the third lens unit has a lens surface on the image side as a strong concave surface facing the image side.

Further, to shorten the total length of that part of the entire zoom lens which follows the third lens unit, while still maintaining the optical performance to be stable at a predetermined level, it is preferable that the focal length $f_3$ of the third lens unit satisfies the following condition:

$$2.0 < f_3/f_W < 3.5 \qquad (3).$$

When the lower limit of the condition (3) is exceeded, as this means that the refractive power of the third lens unit is too strong, it is in some cases that insufficient correction of spherical aberration and coma results. In other cases, it becomes difficult to secure the back focal distance. Conversely, when the upper limit is exceeded, the total length of the entire zoom lens does not become short enough.

Further, to achieve a further shortening the total length of that part of the entire zoom lens which follows the third lens unit, the total movement of the fourth lens unit is reduced. In this case, it is preferable that the focal length $f_4$ of the fourth lens unit satisfies the following condition:

$$1.9 < f_4/f_W < 3.2 \qquad (4).$$

When the lower limit of the condition (4) is exceeded, as this means that the refractive power of the fourth lens unit is too strong, the spherical aberration varies to large extent with zooming. Conversely, when the upper limit is exceeded, the movement of the fourth lens unit becomes too much longer. So, the air separation between the third and fourth lens units has to be ever widened, thus failing to produce a sufficient effect of shortening the total length of the entire zoom lens.

Further, to achieve a further shortening of the total length of the entire zoom lens, the length of the zoom section is reduced. To this purpose, it is preferable that the focal length $f_2$ of the second lens unit satisfies the following condition:

$$0.2 < |f_2 / \sqrt{f_W \cdot f_T}| < 0.3 \qquad (4)$$

where $f_T$ is a focal length in the telephoto end of the entire zoom lens.

The condition (5) has an aim to obtain the predetermined value of the zoom ratio with an advantage of minimizing the variation of aberrations with zooming. When the lower limit of the condition (5) is exceeded, as this means that the refractive power of the second lens unit is too strong, it becomes easy to reduce the size of the entire zoom lens, but the Petzval sum increases to the negative direction, causing the field curvature to increase greatly. Moreover, the range of variation of aberrations with zooming becomes larger. When the refractive power of the second lens unit is too weak as exceeding the upper limit, the aberrations vary to lesser extent with zooming, but the total zooming movement of the second lens unit increases in order to obtain the predetermined value of the zoom ratio, causing the total length of the entire zoom lens to increase objectionably.

Further, to construct the third lens unit in an adequate form of the telephoto type, it is preferable that the focal length $f_N$ of the negative lens of the third lens unit satisfies the following condition:

$$0.7 < |f_N/f_3| < 1.5 \qquad (6).$$

When the lower limit of the condition (6) is exceeded, as this means that the refractive power of the negative lens of the third lens unit is too strong, it becomes easy to reduce the size of the entire zoom lens, but the Petzval sum becomes much too large in the negative sense. So, it becomes difficult to correct the field curvature. Conversely, when the refractive power is too weak as exceeding the upper limit, the effect of shortening the total length becomes insufficient.

By satisfying the additional conditions described above, the zoom lens according to the invention is obtained with more improved results. To facilitate the shortening of the total length of the entire zoom lens, it is essential to reduce the thickness of every lens unit itself.

In the first embodiment, to reduce the number of lens elements, aspheric surfaces are introduced into the lens units, particularly, the third and fourth lens units.

Also, in the first embodiment, the variation of aberrations with zooming or focusing is corrected well. To this purpose, the fourth lens unit is composed of a positive lens and a negative meniscus lens, totaling two lenses.

Also, for the first lens unit, it is preferable that a negative lens thereof is made up from a glass material whose Abbe number $v_{1N}$ lies within the following range:

$$v_{1N} < 23$$

When this condition is satisfied, the achromatic effect is enhanced to allow for reduction of the thickness of a positive lens of the first lens unit.

Under the condition (4), the Petzval sum of the entire zoom lens takes a large value, particularly, when in the negative sense. For the second lens unit, therefore, it is also preferable that at least one negative lens of the second lens unit is a lens whose refractive index $N_{2N}$ satisfies the following condition:

$$N_{2N} > 1.85.$$

The first lens unit is, as a rule, composed of a cemented lens of plus-minus refractive power arrangement and a positive meniscus lens. The cemented lens may otherwise be made up in broken contact to form a space between its positive and negative lenses, thereby shifting the rear principal point of the first lens unit toward the second lens unit. Even with this, when increasing the maximum field angle, it is also possible to suppress the resultant increase of the diameter of the front lens members to a minimum, provided that the real separation between the first and second lens units is kept to be the same.

Also, the negative cemented lens of the second lens unit may be divided into two lenses, or negative and positive ones. If so, the degree of freedom on the aberration correction is increased.

Next, the numerical examples 1 to 3 of the invention are shown. In the numerical data for the examples 1 to 3, Ri is the radius of curvature of the i-th lens surface, when counted from the object side, Di is the i-th axial thickness or air separation, and Ni and vi are respectively the refractive index and Abbe number of the glass of the i-th lens element.

The values of the factors in the above-described conditions (1) to (6) for the numerical examples 1 to 3 are listed in Table-1.

It is noted in the numerical examples 1 to 3 that the last two surfaces R19 and R20 define a face plate or like glass material.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

In the values of the aspheric coefficients, the notation "e-0X" means $10^{-x}$.

NUMERICAL EXAMPLE 1

| f = 1 ~ 10.01 | Fno = 1.85 ~ 2.50 | 2ω = 61.7° ~ 6.8° | |
|---|---|---|---|
| R1 = 10.168 | D1 = 0.17 | N1 = 1.846659 | v1 = 23.8 |
| R2 = 3.618 | D2 = 1.20 | N2 = 1.696797 | v2 = 55.5 |
| R3 = −23.963 | D3 = 0.04 | | |
| R4 = 3.274 | D4 = 0.64 | N3 = 1.772499 | v3 = 49.6 |
| R5 = 9.385 | D5 = Variable | | |
| R6 = 9.119 | D6 = 0.12 | N4 = 1.882997 | v4 = 40.8 |
| R7 = 0.886 | D7 = 0.47 | | |
| R8 = −1.285 | D8 = 0.12 | N5 = 1.603112 | v5 = 60.7 |
| R9 = 1.367 | D9 = 0.47 | N6 = 1.846659 | v6 = 23.8 |
| R10 = −20.061 | D10 = Variable | | |
| R11 = 1.317* | D11 = 0.66 | N7 = 1.669100 | v7 = 55.4 |
| R12 = −9.175 | D12 = 0.17 | | |
| R13 = Stop | D13 = 0.20 | | |
| R14 = 1.673 | D14 = 0.12 | N8 = 1.922862 | v8 = 20.9 |
| R15 = 0.975 | D15 = Variable | | |
| R16 = 1.587* | D16 = 0.61 | N9 = 1.583126 | v9 = 59.4 |
| R17 = −1.913 | D17 = 0.12 | N10 = 1.846659 | v10 = 23.8 |
| R18 = −4.587 | D18 = 0.18 | | |
| R19 = ∞ | D19 = 0.85 | N11 = 1.516330 | v11 = 64.2 |
| R20 = ∞ | | | |

| Variable | Focal Length | | |
|---|---|---|---|
| Separation | 1.00 | 3.37 | 10.01 |
| D5 | 0.17 | 1.63 | 2.53 |
| D10 | 2.48 | 1.02 | 0.12 |
| D15 | 1.35 | 0.51 | 1.36 |

Aspheric Coefficients:

R11: K = −1.12681e + 00  B = 3.06172e − 03  C = −9.26342e − 04
     D = 0.00000e + 00   E = 0.0000e + 00
R16: K = −1.25939e + 00  B = 1.82396e − 02  C = 1.68665e − 03
     D = 0.00000e + 00   E = 0.00000e + 00

(*:Aspheric Surface)

NUMERICAL EXAMPLE 2

| f = 1 ~ 10.00 | Fno = 1.85 ~ 2.52 | 2ω = 61.7° ~ 6.8° | |
|---|---|---|---|
| R1 = 9.944 | D1 = 0.17 | N1 = 1.846659 | v1 = 23.8 |
| R2 = 3.667 | D2 = 1.17 | N2 = 1.693501 | v2 = 53.2 |
| R3 = −28.290 | D3 = 0.04 | | |
| R4 = 3.401 | D4 = 0.64 | N3 = 1.772499 | v3 = 49.6 |
| R5 = 10.226 | D5 = Variable | | |
| R6 = 9.790 | D6 = 0.12 | N4 = 1.882997 | v4 = 40.8 |
| R7 = 0.981 | D7 = 0.47 | | |
| R8 = −1.335 | D8 = 0.12 | N5 = 1.651597 | v5 = 58.5 |
| R9 = 1.435 | D9 = 0.46 | N6 = 1.846659 | v6 = 23.8 |
| R10 = −14.988 | D10 = Variable | | |
| R11 = 1.370* | D11 = 0.63 | N7 = 1.669100 | v7 = 55.4 |
| R12 = −25.678 | D12 = 0.17 | | |
| R13 = Stop | D13 = 0.20 | | |
| R14 = 1.581 | D14 = 0.12 | N8 = 1.922862 | v8 = 20.9 |
| R15 = 1.026 | D15 = Variable | | |
| R16 = 1.686* | D16 = 0.61 | N9 = 1.583126 | v9 = 59.4 |
| R17 = −1.599 | D17 = 0.12 | N10 = 1.846659 | v10 = 23.8 |
| R18 = −3.743 | D18 = 0.18 | | |
| R19 = ∞ | D19 = 0.85 | N11 = 1.516330 | v11 = 64.2 |
| R20 = ∞ | | | |

| Variable | Focal Length | | |
|---|---|---|---|
| Separation | 1.00 | 3.40 | 10.00 |
| D5 | 0.17 | 1.68 | 2.60 |
| D10 | 2.55 | 1.05 | 0.12 |
| D15 | 1.34 | 0.50 | 1.34 |

Aspheric Coefficients:

R11: K = −1.02907e + 00  B = 2.94146e − 03  C = −1.31196 − 03
     D = 3.06659e − 03   E = −1.50570e − 03
R16: K = −1.25939e + 00  B = 2.11836e − 02  C = −6.67059e − 02
     D = 1.96102e − 01   E = −1.69445e − 01

(*:Aspheric Surface)

NUMERICAL EXAMPLE 3

| f = 1 ~ 10.00 | Fno = 1.85 ~ 2.65 | 2ω = 61.7° ~ 6.8° | |
|---|---|---|---|
| R1 = 10.578 | D1 = 0.17 | N1 = 1.923070 | v1 = 18.9 |
| R2 = 3.776 | D2 = 1.07 | N2 = 1.701536 | v2 = 41.2 |
| R3 = −22.567 | D3 = 0.04 | | |
| R4 = 3.385 | D4 = 0.60 | N3 = 1.799516 | v3 = 42.2 |
| R5 = 11.032 | D5 = Variable | | |
| R6 = 11.147 | D6 = 0.12 | N4 = 1.882997 | v4 = 40.8 |
| R7 = 0.982 | D7 = 0.47 | | |
| R8 = −1.352 | D6 = 0.12 | N5 = 1.651597 | v5 = 58.5 |
| R9 = 1.408 | D9 = 0.46 | N6 = 1.846659 | v6 = 23.8 |
| R10 = −14.917 | D10 = Variable | | |
| R11 = 1.363* | D11 = 0.61 | N7 = 1.669100 | v7 = 55.4 |
| R12 = −14.111 | D12 = 0.17 | | |
| R13 = Stop | D13 = 0.20 | | |
| R14 = 1.623 | D14 = 0.12 | N8 = 1.922862 | v8 = 20.9 |
| R15 = 1.024 | D15 = Variable | | |
| R16 = 1.723* | D16 = 0.61 | N9 = 1.583126 | v9 = 59.4 |
| R17 = −1.646 | D17 = 0.12 | N10 = 1.846659 | v10 = 23.8 |
| R18 = −3.976 | D18 = 0.18 | | |
| R19 = ∞ | D19 = 0.85 | N11 = 1.516330 | v11 = 64.2 |
| R20 = ∞ | | | |

| Variable | Focal Length | | |
|---|---|---|---|
| Separation | 1.00 | 3.39 | 10.00 |
| D5 | 0.18 | 1.68 | 2.61 |
| D10 | 2.55 | 1.05 | 0.12 |
| D15 | 1.37 | 0.50 | 1.37 |

Aspheric Coefficients:

R11: K = −1.07573e + 00  B = 3.25487e − 03  C = −5.22703e − 03

-continued

| | | | |
|---|---|---|---|
| | D = 8.94018e − 03 | E = −4.70196e − 03 | |
| R16: | K = −1.25939e + 00 | B = 2.01409e − 02 | C = −6.52327e − 02 |
| | D = 1.91489e − 01 | E = −1.66520e − 01 | |

(*:Aspheric Surface)

TABLE 1

| | Numerical Example | | |
|---|---|---|---|
| Condition | 1 | 2 | 3 |
| (1) $D_{23}/f_W$ | 0.122 | 0.122 | 0.122 |
| (2) $D_{3M}/f_W$ | 0.49 | 0.49 | 0.49 |
| (3) $f_3/f_W$ | 2.592 | 2.769 | 2.687 |
| (4) $f_4/f_W$ | 2.471 | 2.524 | 2.621 |
| (5) $\|f_2/\sqrt{f_W \cdot f_T}\|$ | 0.262 | 0.270 | 0.270 |
| (6) $\|f_N/f_3\|$ | 1.066 | 1.278 | 1.242 |

It will be appreciated from the foregoing that, according to the invention, the conditions are set forth for the refractive powers of the four lens units, the zooming movements of the second and fourth lens units and the position of the aperture stop, and the focusing lens configuration that moves the fourth lens unit is employed. By these, it is made possible to achieve a zoom lens of the rear focus type which has a zoom ratio of about 10 with the bulk and size of the entire zoom lens being minimized, while still permitting a good correction of aberrations to be done throughout the entire zooming range. Moreover, the variation of aberrations with focusing is lessened for high optical performance, when the relative aperture is taken at as large a value as 1.8 in F-number.

Next, examples of zoom lenses as improved over the preceding ones are described.

The zoom lens comprises, in order from an object side, a first lens unit of positive refractive power stationary during zooming, a second lens unit of negative refractive power, a third lens unit of positive refractive power and a fourth lens unit of positive refractive power, totaling four lens units. During zooming from the wide-angle end to the telephoto end, the second lens unit axially moves toward the image side, while simultaneously moving the fourth lens unit to compensate for the image shift with zooming. Focusing is performed by axially moving the fourth lens unit. This zoom lens is to be used together with optical members which do not have refractive powers on the image side thereof, being characterized in that, when these optical members are removed, the distance TD from the first lens surface on the object side to the image plane in the paraxial zone falls within the following range:

$$0.8 \leq TD/f_T \leq 1.05 \quad (7)$$

where $f_T$ is the length in the telephoto end of the entire zoom lens.

Figure 5:
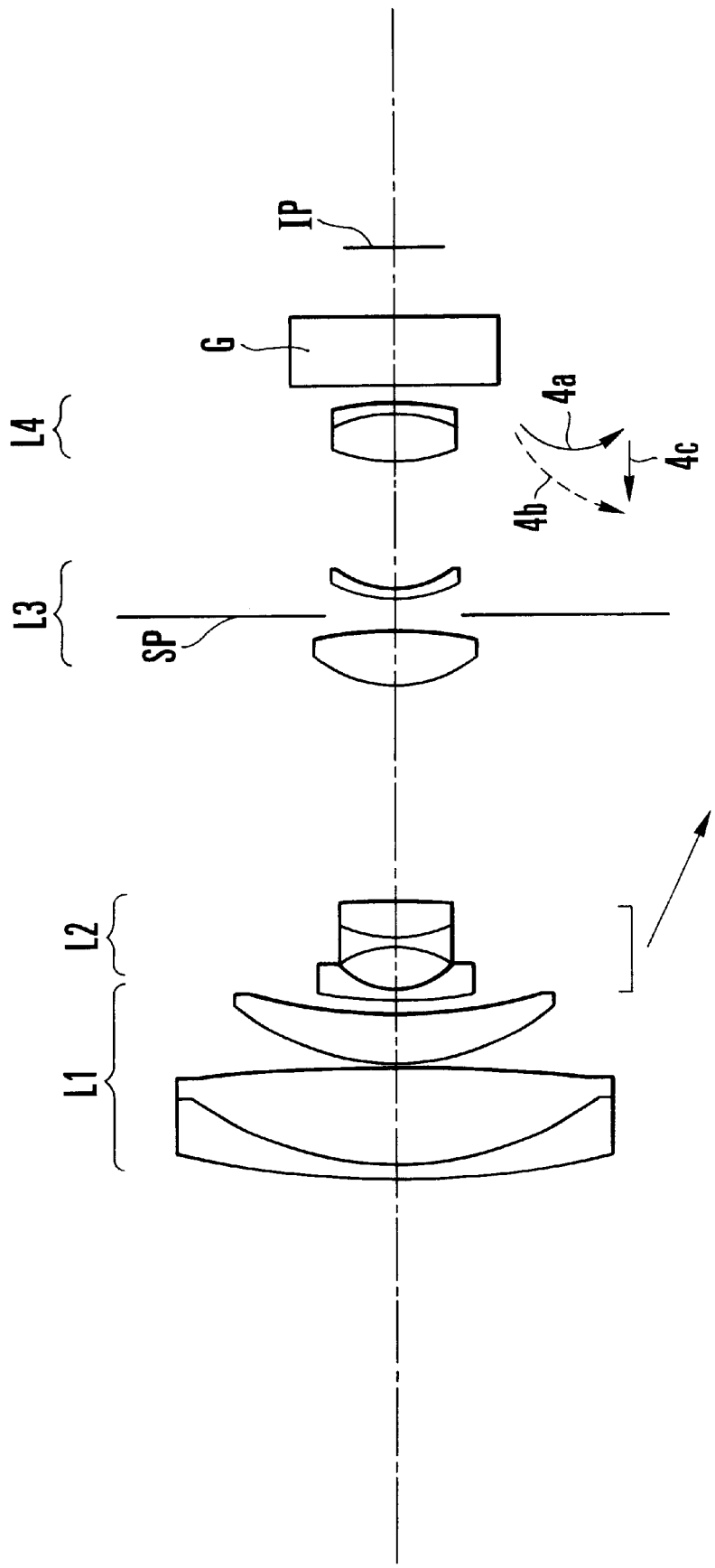
FIG. 5 is a longitudinal section view of a second embodiment (numerical examples 4 to 6) of a zoom lens according to the invention in the wide-angle end.
Figures 1, 2, 3, 4, 6:
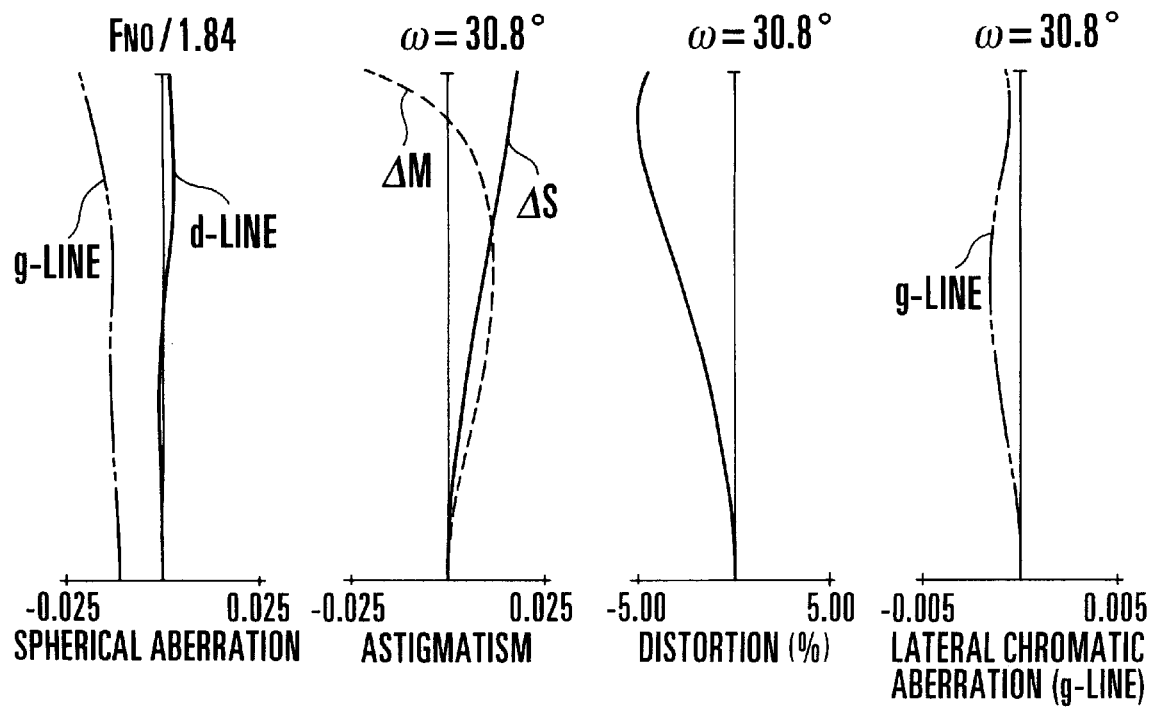
Figures 1, 2, 3, 4, 7:
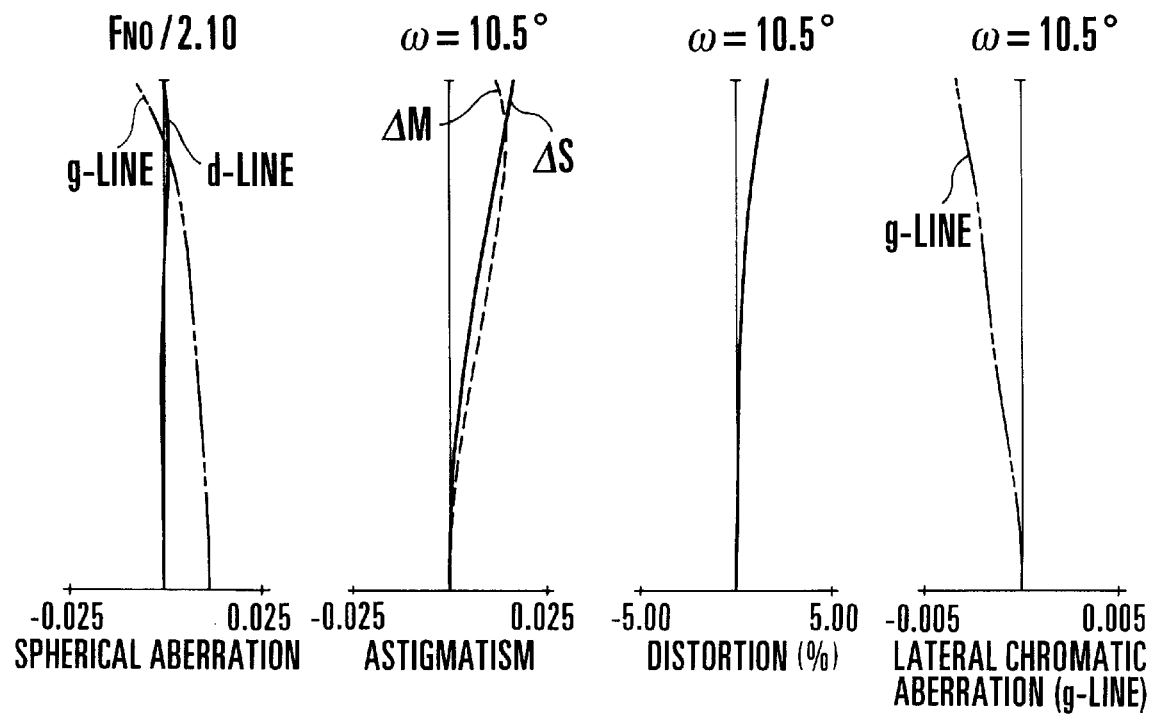
Figures 1, 2, 3, 4, 8:
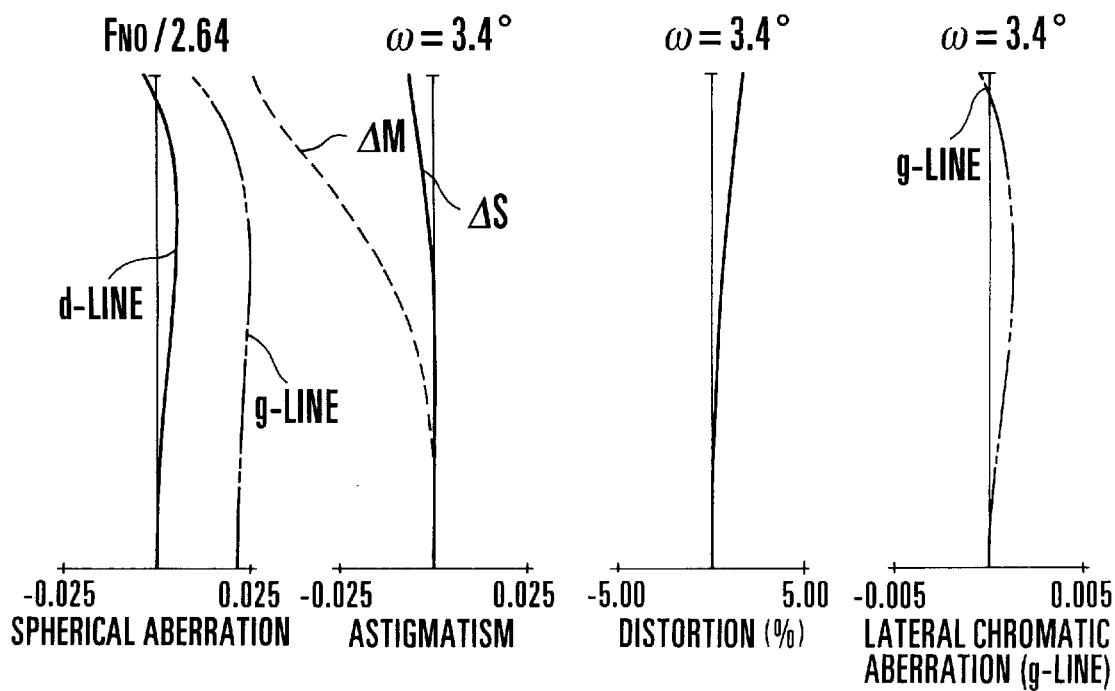
Figures 1, 2, 3, 4, 9:
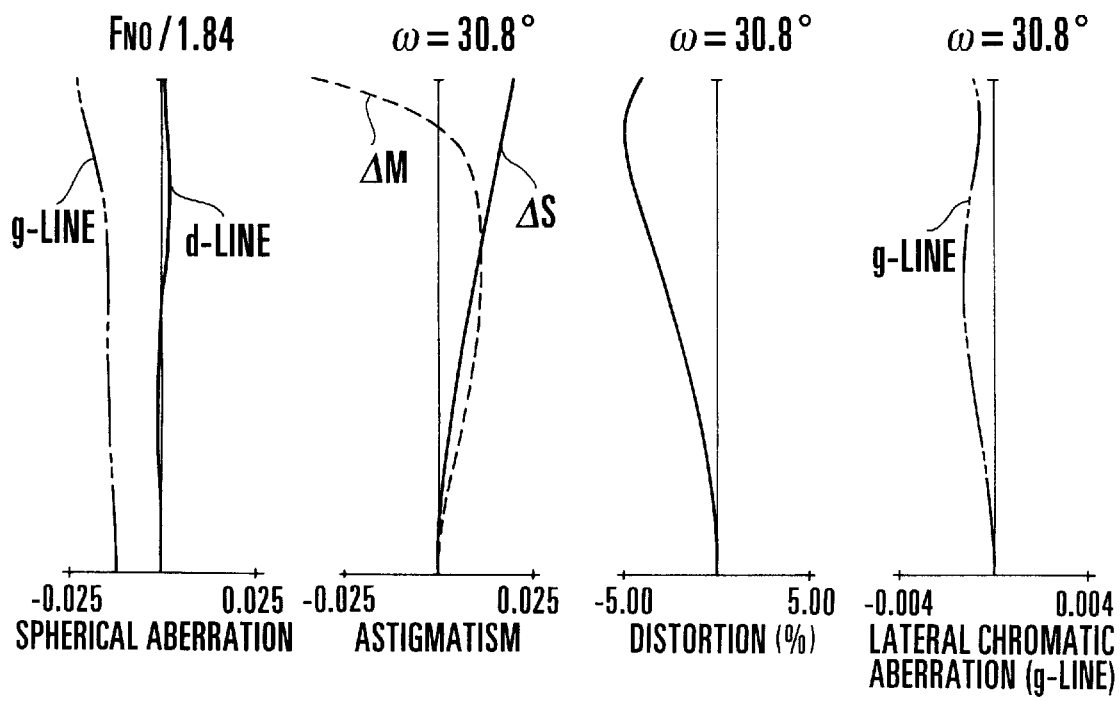
Figures 1, 2, 3, 4, 10:
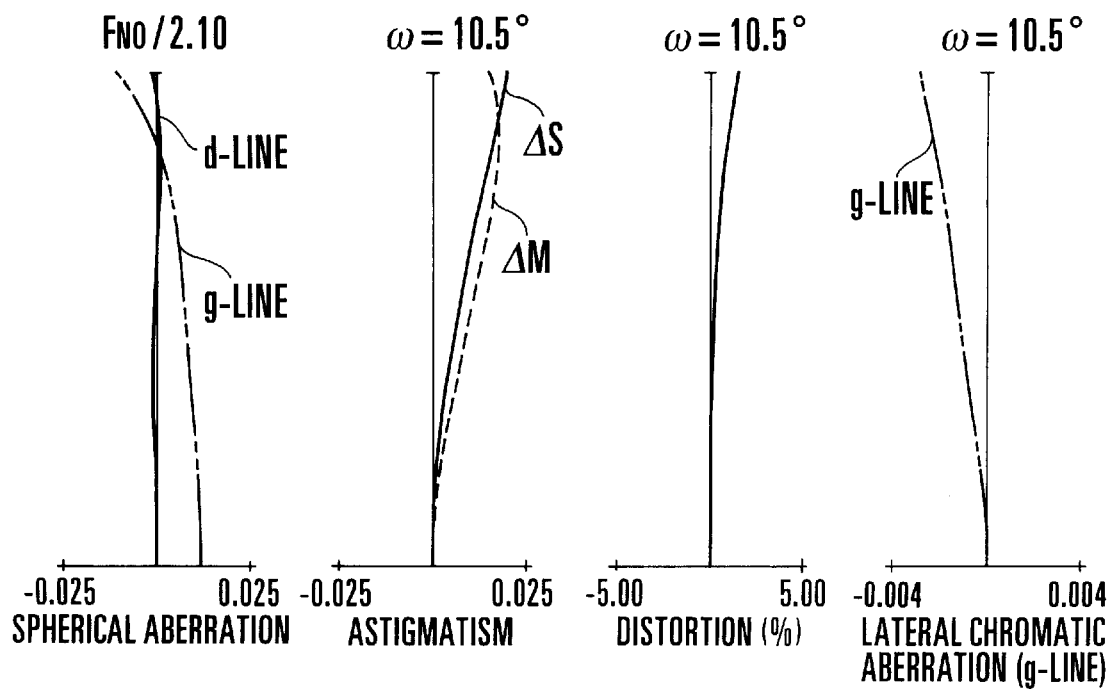
Figures 1, 2, 3, 4, 11:
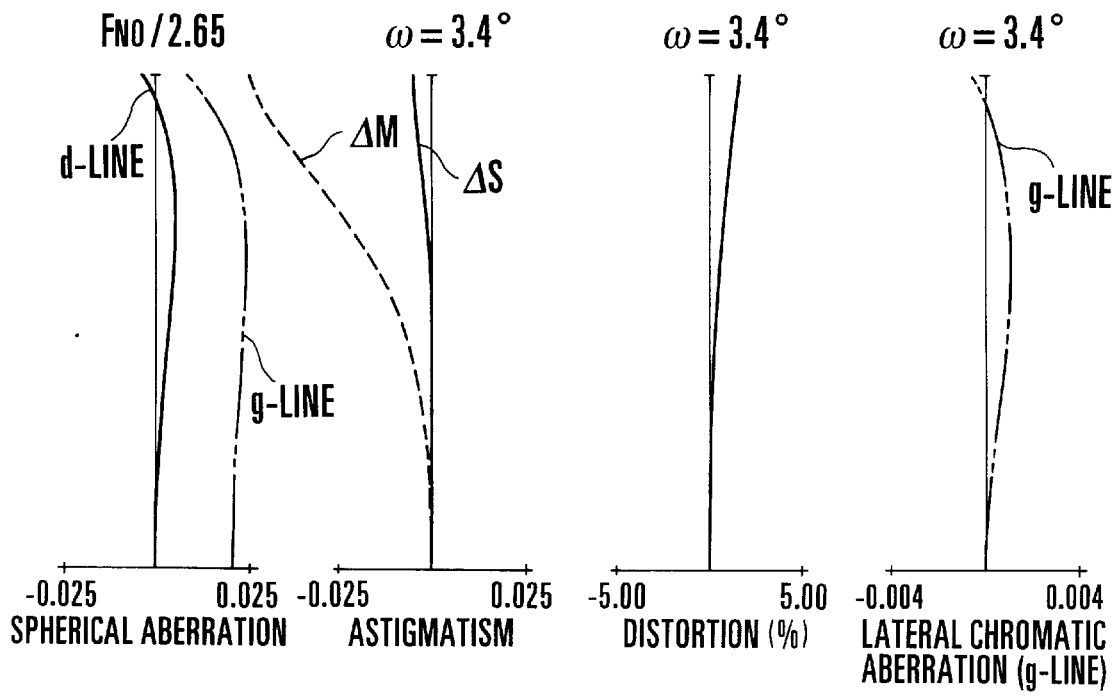
Figures 1, 2, 3, 4, 12:
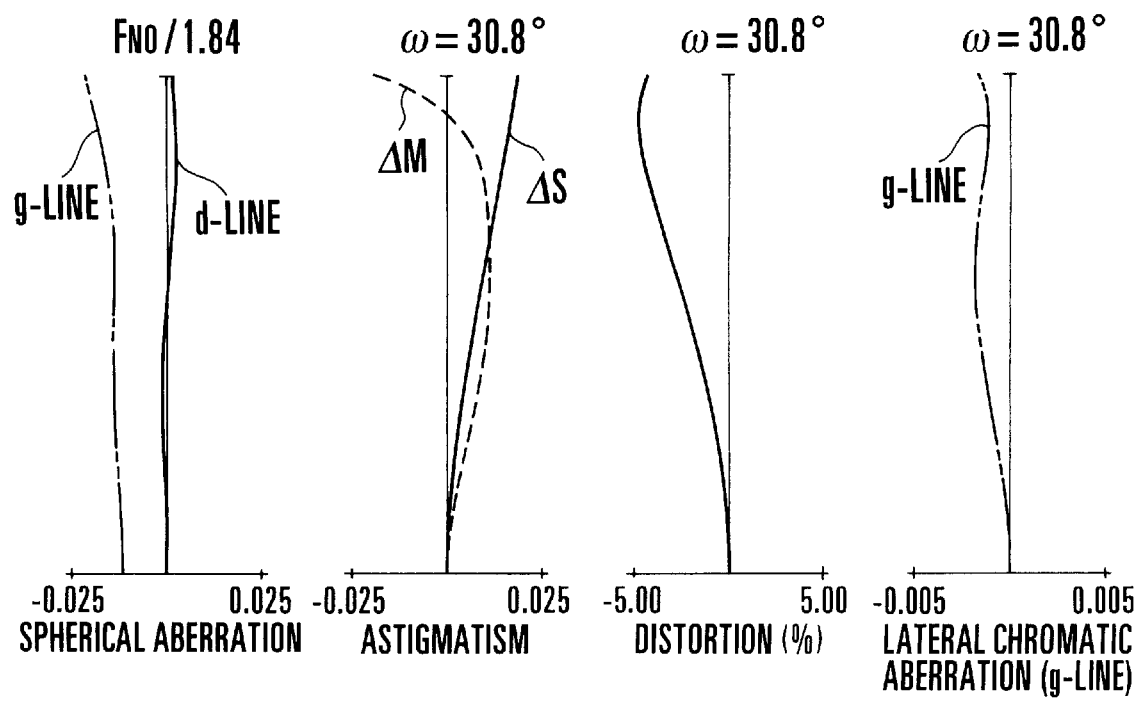
Figures 1, 2, 3, 4, 13:
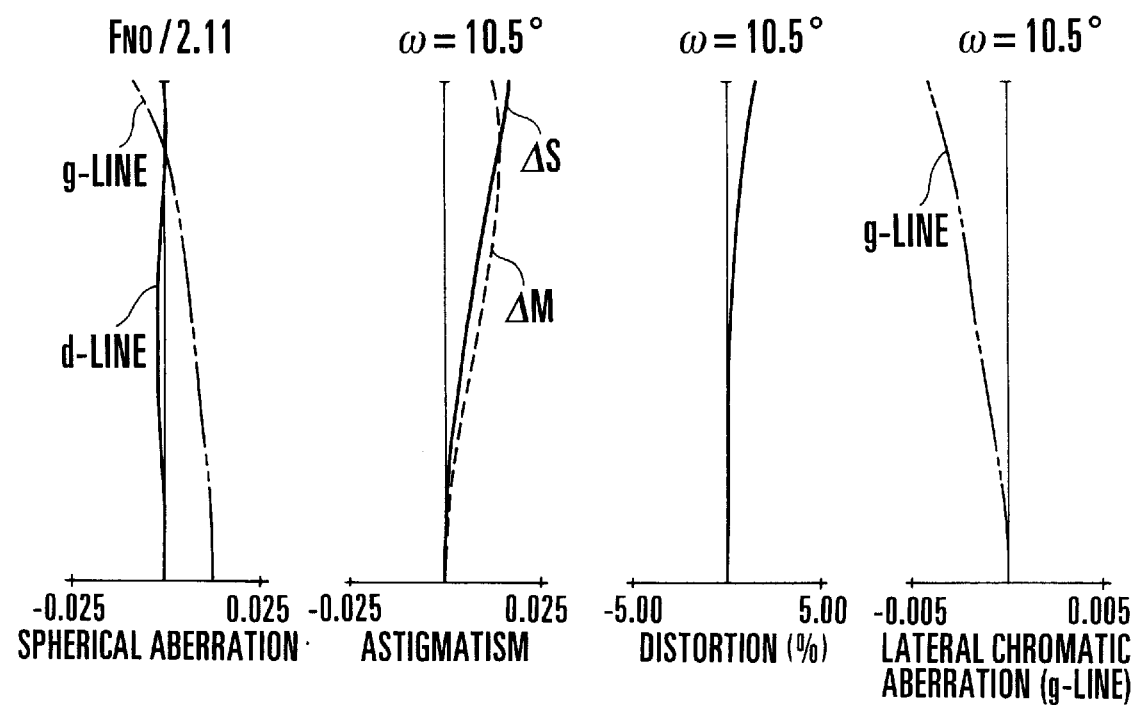
Figures 1, 2, 3, 4, 14:
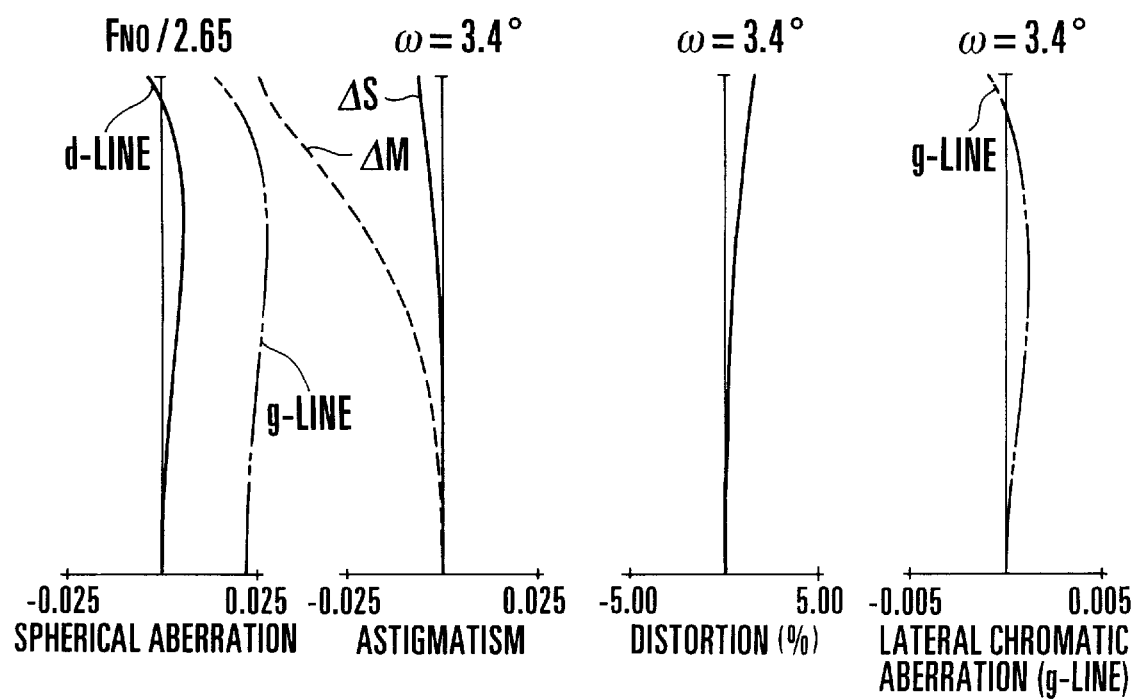

FIG. 5 is a lens block diagram of a second embodiment (numerical examples 4 to 6) of the invention in the wide-angle end. In FIG. 5, reference character L1 denotes a first lens unit of positive refractive power, reference character L2 denotes a second lens unit of negative refractive power, reference character L3 denotes a third lens unit of positive refractive power, and reference character L4 denotes a fourth lens unit of positive refractive power. SP stands for a stop, IP stands for the image plane, and G stands for the glass block such as optical filter.

During zooming from the wide-angle end to the telephoto end, the second lens unit axially moves toward the image side as shown by the arrow. The image shift with zooming is compensated for by moving the fourth lens unit in a locus convex toward the object side.

Focusing is performed by axially moving the fourth lens unit. That is, the rear focus type is employed. When remaining focused on an infinitely distant object and an object at the minimum distance, the fourth lens unit L4 moves in the loci shown in FIG. 5 by a solid line curve 4a and a dashed line curve 4b, respectively, to compensate for the image shift with zooming. The first and third lens units remain stationary during zooming and during focusing. It is noted that the first lens unit may otherwise be made movable for zooming in order to lessen the duty of varying the focal length the second lens unit bears.

In the second embodiment, with the setting, for example, in the telephoto end, when focusing from an infinitely distant object to closer objects, the fourth lens unit moves forward as shown by a straight line 4c in FIG. 5. In the second embodiment, as compared with the conventional 4-unit zoom lens which moves the first lens unit forward for focusing, the use of the rear focusing method like that described above produces an advantage of preventing the effective diameter of the first lens unit from increasing.

In addition, as described above, the condition (7) is set forth for the distance TD from the first lens surface on the object side to the paraxial image plane with the optical members of no refractive powers on the image side removed. The parameters are so determined that this distance TD and the focal length in the telephoto end of the entire zoom lens satisfy the above-described condition (7). This enables the entire zoom lens to be improved in the compact form, while still maintaining a good optical performance throughout the entire zooming range and throughout the entire focusing range. A high range zoom lens is thus obtained.

If attempts are made to shorten the total length of the entire zoom lens beyond the lower limit of the condition (7), the Petzval sum becomes much too large in the negative direction, so that it becomes difficult to correct field curvature. Conversely, when the upper limit of the condition (7) is exceeded, the aberrations become easier to correct, but the total length of the entire zoom lens increases objectionably.

Moreover, according to the invention, the third lens unit is composed of, in order from the object side, one positive lens and one negative lens of meniscus form having a convex surface facing the object side. With this arrangement, the third lens unit takes a form of the so-called "telephoto" type. Furthermore, in order to utilize the space formed between the positive lens and the negative lens of the third lens unit with high efficiency, an aperture stop SP is disposed between the positive lens and the negative lens, thereby making it possible to shorten the total length of that part of the entire zoom lens which follows the third lens unit.

Next explanation is given about this arrangement. To achieve reduction of the size of the zoom lens, there is need to strengthen the negative refractive power of the second lens unit in order to reduce its total zooming movement, so far as the problem of aberration correction permits. As the negative refractive power of the second lens unit increases, the divergence of the light bundle from the second lens unit becomes stronger. Therefore, to shorten the total length of that part of the entire zoom lens which follows the third lens unit, it is essential to reduce the interval between the principal points of the second and third lens units.

On the contrary, in the prior art, the aperture stop is disposed between the second and third lens units. Therefore, there is a need to create an additional space the stop is to occupy. If, in this case, attempts are made to much more shorten the total length of that part of the entire zoom lens which follows the third lens unit, a necessity arises for making even stronger the refractive power of the negative lens of the third lens unit to increase the telephoto ratio. Therefore, the Petzval sum of the entire zoom lens, which is once increased in the negative sense as the refractive power of the second lens unit is strengthened, is further increased in the negative sense. Particularly, the sagittal curvature of field becomes difficult to correct.

On this account, according to the invention, the aperture stop is disposed in the space between the positive lens and the negative lens in the third lens unit. This allows the separation between the second and third lens units to be reduced. Conversely, the separation between the positive lens and the negative lens of the third lens unit is widened to lessen the increase of the negative Petzval sum resulting from the decrease of the distance from the third lens unit to the image plane, thus permitting the field curvature to be corrected well when the total length of the entire zoom lens is shortened.

The features described above suffice for accomplishing the zoom lens the invention aims at. To further improve the compact form of the entire zoom lens in such a manner as to secure high optical performance throughout the entire zooming range, it is preferable to satisfy one of the following conditions.

Letting an air separation between the second lens unit and the third lens unit in the telephoto end be denoted by $D_{23}$, and a focal length in the wide-angle end of the entire zoom lens be denoted by $f_W$, the following condition is satisfied:

$$0.05 < D_{23}/f_W < 0.2 \tag{8}$$

The condition (8) has an aim to achieve a shortening of the entire zoom lens advantageously.

When this separation $D_{23}$ becomes shorter beyond the lower limit of the condition (8), it will happen that, as the second lens unit is moved in the position adjusting operation or the like, the second lens unit mechanically interferes with the third lens unit. So, it should be avoided. Conversely, when the upper limit is exceeded, the total length of the entire zoom lens does not become short enough.

Further, the first lens unit includes at least one negative lens made up from a material whose refractive index $N_{1N}$ and Abbe number $v_{1N}$ lie within the respective following ranges:

$$v_{1N} < 23 \tag{9}$$

$$1.85 < N_{1N} \tag{10}$$

The conditions (9) and (10) have an aim to decrease the thickness of the first lens unit in order to shorten the total length of the entire zoom lens in such a manner as to correct well chromatic aberrations. By using the glass material that satisfies the conditions (9) and (10), the achromatic effect is enhanced to allow for reduction of the thickness of a positive lens of the first lens unit. Moreover, the Petzval sum of the entire zoom lens is improved from taking a large value, particularly in the negative direction.

Further, the focal length $f_2$ of the second lens unit lies within the respective following range:

$$0.2 < |f_2 / \sqrt{f_W \cdot f_T}| < 0.3 \tag{11}$$

where $f_T$ and $f_W$ are focal lengths in the telephoto end and the wide-angle end of the entire zoom lens, respectively.

The condition (11) has an aim to reduce the length of the zoom section, thereby achieving a further shortening of the total length of the entire zoom lens.

In particular, the condition (11) gives a proper range for the refractive power of the second lens unit so that the predetermined zoom ratio is obtained with an advantage of decreasing the variation of aberrations with zooming. When the lower limit is exceeded, as this means that the refractive power of the second lens unit is too strong, the compact form of the entire zoom lens becomes easy to improve, but the Petzval sum increases to the negative direction. So, large field curvature results. Moreover, the variation of aberrations with zooming gets larger. When the refractive power of the second lens unit is too weak as exceeding the upper limit, the stability of aberrations becomes better throughout the entire zooming range, but the required total zooming movement for producing the predetermined zoom ratio increases to increase the total length of the entire zoom lens objectionably.

Further, at least one aspheric surface is used in the third lens unit and/or the fourth lens unit. This makes it easier to correct various aberrations well with the limitation of the number of constituent lenses to a minimum.

Next, the numerical examples 4 to 6 of the invention are shown. In the numerical data for the examples 4 to 6, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side. In the numerical examples 4 to 6, the last two lens surfaces define a glass block such as an optical filter or face plate. The values of the factors in the above-described conditions (7) to (11) for the numerical examples 4 to 6 are listed in Table-2. The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

In the values of the aspheric coefficients, the notation "e-0X" means $10^{-x}$.

NUMERICAL EXAMPLE 4

| f = 1 ~ 10.00 | Fno = 1.84 ~ 2.64 | 2ω = 61.6° ~ 6.8° | |
|---|---|---|---|
| R1 = 11.980 | D1 = 0.17 | N1 = 1.92286 | v1 = 20.9 |
| R2 = 4.180 | D2 = 1.10 | N2 = 1.78589 | v2 = 44.2 |
| R3 = −19.421 | D3 = 0 04 | | |
| R4 = 3.000 | D4 = 0.55 | N3 = 1.77249 | v3 = 49.6 |
| R5 = 6.278 | D5 = Variable | | |
| R6 = 5.431 | D8 = 0.12 | N4 = 1.88299 | v4 = 40.8 |
| R7 = 0.949 | D7 = 0.49 | | |

-continued

| | | | |
|---|---|---|---|
| R8 = −1.178 | D6 = 0.12 | N5 = 1.66671 | ν5 = 48.3 |
| R9 = 1.518 | D9 = 0.42 | N8 = 1.84665 | ν6 = 23.8 |
| R10 = −10.463 | D10 = Variable | | |
| R11 = 1.419* | D11 = 0.61 | N7 = 1.58312 | ν7 = 59.4 |
| R12 = −4.395* | D12 = 0.17 | | |
| R13 = Stop | D13 = 0.19 | | |
| R14 = 1.638 | D14 = 0.12 | N8 = 1.92286 | ν8 = 20.9 |
| R15 = 1.107 | D15 = Variable | | |
| R16 = 1.981* | D16 = 0.54 | N9 = 1.58312 | ν9 = 59.4 |
| R17 = −1.745 | D17 = 0.12 | N10 = 1.84665 | ν10 = 23.8 |
| R18 = −3.575 | D18 = 0.18 | | |
| R19 = ∞ | D19 = 0.80 | N11 = 1.51633 | ν11 = 64.2 |
| R20 = ∞ | | | |

| Variable | Focal Length | | |
|---|---|---|---|
| Separation | 1.00 | 5.04 | 10.00 |
| D5 | 0.17 | 2.01 | 2.53 |
| D10 | 2.45 | 0.62 | 0.10 |
| D15 | 1.48 | 0.55 | 1.48 |

Aspheric Coefficients:

| | | | |
|---|---|---|---|
| R11: | K = −1.543 | B = 1.372e − 02 | C = −1.849e − 03 |
| | D = 9.079e − 03 | E = −2.990e − 03 | |
| R12: | K = −9.270 | B = −1.172e − 03 | C = 7.837e − 03 |
| | D = 0 | E = 0 | |
| R16: | K = −4.313e − 02 | B = −1.153e − 02 | C = 8.980e − 03 |
| | D = −3.936e − 03 | E = −9.666e − 03 | |

NUMERICAL EXAMPLE 5 f = 1 ~ 10.00    Fno = 1.84 ~ 2.65    2ω = 61.6° ~ 6.8°

| | | | |
|---|---|---|---|
| R1 = 11.777 | D1 = 0.17 | N1 = 1.92286 | ν1 = 20.9 |
| R2 = 4.095 | D2 = 1.10 | N2 = 1.78589 | ν2 = 44.2 |
| R3 = −18.171 | D3 = 0.04 | | |
| R4 = 2.902 | D4 = 0.55 | N3 = 1.77248 | ν3 = 49.6 |
| R5 = 5.902 | D8 = Variable | | |
| R6 = 5.507 | D6 = 0.12 | N4 = 1.88299 | ν4 = 40.8 |
| R7 = 0.928 | D7 = 0.48 | | |
| R8 = −1.147 | D6 = 0.12 | N5 = 1.66671 | ν5 = 48.3 |
| R9 = 1.478 | D9 = 0.42 | N6 = 1.84665 | ν6 = 23.8 |
| R10 = −10.230 | D10 = Variable | | |
| R11 = 1.414* | D11 = 0.61 | N7 = 1.58312 | ν7 = 59.4 |
| R12 = −4.268* | D12 = 0.17 | | |
| R13 = Stop | D13 = 0.19 | | |
| R14 = 1.643 | D14 = 0.12 | N8 = 1.92286 | ν8 = 20.9 |
| R18 = 1.107 | D15 = Variable | | |
| R16 = 1.953* | D16 = 0.54 | N9 = 1.58312 | ν9 = 59.4 |
| R17 = −1.737 | D17 = 0.12 | N10 = 1.84665 | ν10 = 23.8 |
| R18 = −3.539 | D18 = 0.18 | | |
| R19 = ∞ | D19 = 0.80 | N11 = 1.51633 | ν11 = 64.2 |
| R20 = ∞ | | | |

| Variable | Focal Length | | |
|---|---|---|---|
| Separation | 1.00 | 5.04 | 10.00 |
| D5 | 0.17 | 1.95 | 2.46 |
| D10 | 2.38 | 0.60 | 0.10 |
| D15 | 1.49 | 0.55 | 1.49 |

Aspheric Coefficients:

| | | | |
|---|---|---|---|
| R11: | K = −1.563 | B = 1.324e − 02 | C = −1.173e − 03 |
| | D = 1.018e − 02 | E = −3.512e − 03 | |
| R12: | K = −8.513 | B = −1.430e − 03 | C = 9.331e − 03 |
| | D = 0 | E = 0 | |
| R16: | K = 3.755e − 02 | B = −1.285e − 02 | C = 7.704e − 03 |
| | D = −5.117e − 03 | E = −5.486e − 03 | |

NUMERICAL EXAMPLE 6 f = 1 ~ 10.00    Fno = 1.84 ~ 2.65    2ω = 61.6° ~ 6.8°

| | | | |
|---|---|---|---|
| R1 = 12.441 | D1 = 0.17 | N1 = 1.923070 | ν1 = 18.9 |
| R2 = 4.130 | D2 = 1.09 | N2 = 1.806098 | ν2 = 41.0 |
| R3 = −19.686 | D3 = 0.04 | | |
| R4 = 2.971 | D4 = 0.55 | N3 = 1.785896 | ν3 = 44.2 |
| R5 = 6.043 | D5 = Variable | | |
| R6 = 5.183 | D6 = 0.12 | N4 = 1.882997 | ν4 = 40.8 |
| R7 = 0.938 | D7 = 0.49 | | |
| R8 = −1.163 | D8 = 0.12 | N5 = 1.666718 | ν5 = 48.3 |
| R9 = 1.499 | D9 = 0.42 | N6 = 1.846659 | ν6 = 23.8 |
| R10 = −11.019 | D10 = Variable | | |
| R11 = 1.418* | D11 = 0.61 | N7 = 1.583126 | ν7 = 59.4 |
| R12 = −4.314* | D12 = 0.17 | | |
| R13 = Stop | D13 = 0.19 | | |
| R14 = 1.640 | D14 = 0.12 | N8 = 1.922862 | ν8 = 20.9 |
| R16 = 1.107* | D15 = Variable | | |
| R16 = 1.971 | D16 = 0.54 | N9 = 1.583126 | ν9 = 59.4 |
| R17 = −1.734 | D17 = 0.12 | N10 = 1.846659 | ν10 = 23.8 |
| R18 = −3.505 | D18 = 0.18 | | |
| R19 = ∞ | D19 = 0.80 | N11 = 1.516330 | ν11 = 64.2 |
| R20 = ∞ | | | |

| Variable | Focal Length | | |
|---|---|---|---|
| Separation | 1.00 | 5.03 | 10.00 |
| D5 | 0.17 | 1.98 | 2.49 |
| D10 | 2.42 | 0.61 | 0.10 |
| D15 | 1.49 | 0.56 | 1.49 |

Aspheric Coefficients:

| | | | |
|---|---|---|---|
| R11: | K = −1.548 | B = 1.291e − 02 | C = −1.786e − 03 |
| | D = 9.025e − 03 | E = −3.035e − 03 | |
| R12: | K = −8.772 | B = −1.331e − 03 | C = 7.683e − 03 |
| | D = 0 | E = 0 | |
| R16: | K = −7.274e − 02 | B = −9.730e − 03 | C = 4.884e − 03 |
| | D = −7.093e − 04 | E = −7.646e − 03 | |

TABLE 2

| | Numerical Example | | |
|---|---|---|---|
| Condition | 4 | 5 | 6 |
| (7) $TD/f_T$ | 1.03 | 1.03 | 1.04 |
| (8) $DT_{23}/f_W$ | 0.097 | 0.097 | 0.097 |
| (9) $\nu_{1N}$ | 20.9 | 20.9 | 18.9 |
| (10) $N_{1N}$ | 1.9229 | 1.9229 | 1.9230 |
| (11) $\|f_2 / \sqrt{f_W \cdot f_T}\|$ | 0.262 | 0.254 | 0.258 |

According to the invention, the parameters are determined as described above, so that, with the use of the rear focus type, the relative aperture and the zoom ratio are increased in such a manner that the compact form of the entire zoom lens is improved, while still permitting a good stability of aberrations to be maintained throughout the entire zooming range and throughout the entire focusing range. A zoom lens of the rear focus type which has a short total length and is corrected well for good optical performance is thus achieved.

I claim:

1. A zoom lens comprising, in order from an object side to an image side, a first lens unit having a positive refractive power, a second lens unit having a negative refractive power, a third lens unit having a positive refractive power and a fourth lens unit having a positive refractive power, at least said second lens unit and said fourth lens unit being moved to vary magnification and said fourth lens unit being moved to effect focusing, wherein said third lens unit consists of one positive lens and one negative lens, and wherein an aperture stop is disposed between said positive lens and said negative lens.

2. A zoom lens according to claim 1, satisfying the following condition:

$$D_{23}/f_W < 0.25$$

where $D_{23}$ is an air separation between a lens surface closest to the image side of said second lens unit and a lens surface closest to the object side of said third lens unit in a telephoto end, and $f_W$ is a focal length in a wide-angle end of said zoom lens.

3. A zoom lens according to claim 1, satisfying the following condition:

$$0.32 < D_{3M}/f_W < 0.56$$

where $D_{3M}$ is an air separation between said positive lens and said negative lens of said third lens unit, and $f_W$ is a focal length in a wide-angle end of said zoom lens.

4. A zoom lens according to claim 1, wherein said negative lens of said third lens unit has a strong concave surface facing the image side.

5. A zoom lens according to claim 1, satisfying the following condition:

$$2.0 < f_3/f_W < 3.5$$

where $f_3$ is a focal length of said third lens unit, and $f_W$ is a focal length in a wide-angle end of said zoom lens.

6. A zoom lens according to claim 1, satisfying the following condition:

$$1.9 < f_4/f_W < 3.2$$

where $f_4$ is a focal length of said fourth lens unit, and $f_W$ is a focal length in a wide-angle end of said zoom lens.

7. A zoom lens according to claim 1, satisfying the following condition:

$$0.2 < |f_2/\sqrt{f_W \cdot f_T}| < 0.3$$

where $f_2$ is a focal length of said second lens unit, and $f_W$ and $f_T$ are focal lengths in a wide-angle end and in a telephoto end of said zoom lens, respectively.

8. A zoom lens according to claim 1, satisfying the following condition:

$$0.7 < |f_N/f_3| < 1.5$$

where $f_N$ is a focal length of said negative lens of said third lens unit, and $f_3$ is a focal length of said third lens unit.

9. A zoom lens consisting of, in order from an object side to an image side, a first lens unit of positive refractive power stationary during zooming, a second lens unit of negative refractive power, a third lens unit of positive refractive power and a fourth lens unit of positive refractive power, said second lens unit being moved toward the image side to effect zooming from a wide-angle end to a telephoto end and said fourth lens unit being moved to compensate for shifting of an image plane resulting from the zooming, and said fourth lens unit being moved to effect focusing, wherein the following condition is satisfied:

$$0.8 \leq TD/f_T \leq 1.05$$

where TD is a distance from the first lens surface, when counted from the object side, to a paraxial image plane with an optical element of no refractive power on the image side removed, and $f_T$ is a focal length in the telephoto end of said zoom lens.

10. A zoom lens according to claim 9, satisfying the following condition:

$$0.05 < D_{23}/f_W < 0.2$$

where $D_{23}$ is an air separation between said second lens unit and said third lens unit in the telephoto end, and $f_W$ is a focal length in the wide-angle end of said zoom lens.

11. A zoom lens according to claim 9, wherein said third lens unit consists of a positive lens and a negative lens of meniscus form having a convex surface facing the object side.

12. A zoom lens according to claim 11, wherein a stop is disposed between said positive lens and said negative lens of said third lens unit.

13. A zoom lens according to claim 9, wherein said first lens unit has at least one negative lens, and said zoom lens satisfying the following conditions:

$$\nu_{1N} < 23$$

$$1.85 < N_{1N}$$

where $N_{1N}$ and $\nu_{1N}$ are respectively a refractive index and Abbe number of a material of said negative lens.

14. A zoom lens according to claim 9, satisfying the following condition:

$$0.2 < |f_2/\sqrt{f_W \cdot f_T}| < 0.3$$

where $f_2$ is a focal length of said second lens unit, and $f_W$ and $f_T$ are focal lengths in the wide-angle end and in the telephoto end of said zoom lens, respectively.

* * * * *

UNITED STATES PATENT AND TRADEMARK OFFICE
CERTIFICATE OF CORRECTION

PATENT NO. : 5,933,283

DATED : August 3, 1999

INVENTOR(S) : Hiroyuki HAMANO

It is certified that error appears in the above-identified patent and that said Letters Patent is hereby corrected as shown below:

```
ON THE COVER PAGE:

Insert --[30] Foreign Application Priority Data
April 15, 1996   [JP]   Japan     8-118333
July 31, 1996    [JP]   Japan     8-202044--

COLUMN 5:

Line 35, "the total" should read --of the total--.

COLUMN 8:

Line 47, "D6" should read --D8--.

COLUMN 12:

Line 65, "D8" should read --D6--.

COLUMN 13:

Line 1, "D6" should read --D8--.
Line 39, "D8" should read --D5--.
Line 42, "D6" should read --D8--.
Line 49, "R18=1.107" should read --R15=1.107--.
```

UNITED STATES PATENT AND TRADEMARK OFFICE
CERTIFICATE OF CORRECTION

PATENT NO. : 5,933,283

DATED : August 3, 1999

INVENTOR(S) : Hiroyuki HAMANO

It is certified that error appears in the above-identified patent and that said Letters Patent is hereby corrected as shown below:

COLUMN 14:

Line 17, "R16=1.107*" should read --R15=1.107--.
Line 18, "R16=1.971" should read --R16=1.971*--.

COLUMN 16:

Line 38, "satisfying" should read --satisfies--.

Signed and Sealed this

Twentieth Day of February, 2001

Attest:

NICHOLAS P. GODICI

Attesting Officer

Acting Director of the United States Patent and Trademark Office